United States Patent
Li et al.

(10) Patent No.: US 7,459,894 B2
(45) Date of Patent: Dec. 2, 2008

(54) DRIVER WITH CONTROL INTERFACE FACILITATING USE OF THE DRIVER WITH VARIED DC-TO-DC CONVERTER CIRCUITS

(75) Inventors: Guojun Li, ShenZhen (CN); Matteo Traldi, Milan (IT); Weiguo Ge, ShenZhen (CN); Wangsheng Xie, ShenZhen (CN)

(73) Assignees: Shenzhen STS Microelectronics Co. Ltd. (CN); STMicroelectronics Srl (IT)

( * ) Notice: Subject to any disclaimer, the term of this patent is extended or adjusted under 35 U.S.C. 154(b) by 303 days.

(21) Appl. No.: 11/104,909

(22) Filed: Apr. 13, 2005

(65) Prior Publication Data
US 2005/0231183 A1  Oct. 20, 2005

(30) Foreign Application Priority Data
Apr. 16, 2004  (CN) .................... 2004 1 0035040

(51) Int. Cl.
 G05F 1/00    (2006.01)
 H02M 3/335  (2006.01)
(52) U.S. Cl. .................................. 323/285; 363/21.18
(58) Field of Classification Search ......... 323/299–303, 323/222, 282, 285, 289; 363/21.12, 21.18; 307/412; 327/108
See application file for complete search history.

(56) References Cited

U.S. PATENT DOCUMENTS

| | | | |
|---|---|---|---|
| 4,876,637 A * | 10/1989 | Mose et al. ............... 363/37 |
| 5,189,589 A * | 2/1993 | Marschall ................. 361/93.2 |
| 5,793,626 A * | 8/1998 | Jiang ......................... 363/126 |
| 5,844,786 A * | 12/1998 | Yoshida et al. ........... 363/21.01 |
| 6,169,392 B1 | 1/2001 | Kitagawa |
| 6,307,359 B1 | 10/2001 | Uchida |
| 6,316,922 B1 | 11/2001 | Sugahara et al. |
| 6,342,984 B1 | 1/2002 | Hussein et al. |
| 6,459,602 B1 | 10/2002 | Lipcsei |
| 6,472,857 B1 * | 10/2002 | Genest et al. ............... 323/303 |

(Continued)

OTHER PUBLICATIONS

High-Side Positive Current Sensor Monitors Negative Supply, www.maxim-ic.com/appnotes.dfm/appnote_number/2011/In/en, May 11, 2003.

(Continued)

*Primary Examiner*—Shawn Riley
(74) *Attorney, Agent, or Firm*—Lisa K. Jorgenson; William J. Kubida

(57) ABSTRACT

A driver for a DC-to-DC converter that may utilize a flyback or buck-boost converter circuit. The driver includes a driver circuit and an interface circuit. The interface circuit has a sensor sensing an input voltage from a DC supply and generating a sensor signal to a driver selector. The driver selector compares the sensor signal to a comparison voltage to determine the type of converter circuit and then transmits a selector signal to a driver circuit where it is used to control one or more of the components of the driver circuit, such as the logic circuit which is used for driving the converter to regulate the converter output. The sensor includes a sense resistor along with a current-sense amplifier, which is adapted for connection to a high side or a low side of a power supply while still producing a substantially equivalent output voltage or sensor signal.

13 Claims, 7 Drawing Sheets

U.S. PATENT DOCUMENTS

| | | | | |
|---|---|---|---|---|
| 6,522,116 | B1* | 2/2003 | Jordan | 323/288 |
| 6,531,853 | B2* | 3/2003 | Umemoto | 323/282 |
| 6,954,054 | B2* | 10/2005 | Brown | 323/283 |
| 6,958,596 | B1* | 10/2005 | Sferrazza et al. | 323/303 |
| 6,960,906 | B2* | 11/2005 | Yamashita | 323/285 |
| 7,015,680 | B2* | 3/2006 | Moraveji et al. | 323/274 |

OTHER PUBLICATIONS

New Current-Sense Amplifiers Aid Measurement and Control, www.maxin-ic.com/appnotes.dfm/appnote_number/659/In/en, Mar. 13, 2000.

Low-Cost Step-Up/Step-Down Converter Accepts 2V to 16V Inputs, www.maxin-ic.com/appnotes/dfm/appnote_number/227/In/en, Jul. 16, 1998.

Bardelli, Fontanella, Forte, Frattini, Martinelli, Ricotti, and Rossi, Fully Integrated Motor Driver Controller for Hard Disk Drive Using Digital Approach.

Chen, Erickson and Maksimovic, Averaged Switch Modeling of Boundary Conduction Mode Dc-to-Dc Converts, IECON'01: The $27^{th}$ Annual Conference of the IEEE Industrial Electronics Society.

Philips Semiconductors, AN120 An Overview of Switched-Mode Power Supplies - Application Note, Dec. 1988.

* cited by examiner

DRIVER WITH CONTROL INTERFACE FACILITATING USE OF THE DRIVER WITH VARIED DC-TO-DC CONVERTER CIRCUITS

BACKGROUND OF THE INVENTION

1. Related Applications

This application claims the priority benefit of Chinese application Serial No. 200410035040.6 filed on Apr. 16, 2004, the full disclosure of which is incorporated herein by reference.

2. Field of the Invention

The present invention relates generally to voltage converters, and more particularly, to a driver with a smart or adaptive interface that allows the driver to be used in varied direct current (DC) to direct-current (DC) converters utilizing differing types or configurations of converter circuits, such as buck-boost and flyback DC-to-DC converter circuits, without modification of the driver.

3. Relevant Background

Direct-current (DC) to direct-current (DC) converters are well known in the field of electronics. DC-to-DC converters are typically employed to convert from one DC voltage level to another DC voltage level. They are used in a variety of environments. For example, DC-to-DC converters are used to provide a supply voltage to microprocessors and other logic devices and are also used in many electronic systems to provide supply voltage, such as in a disk drive where the converter supplies a desired voltage to a voice coil motor and spindle motors. The voltage source may be a battery, such as in a notebook or handheld computer or electronic device, or some other power source that provides a DC voltage, such as 1 to 36 V. The DC-to-DC converter functions to convert this supply or input voltage to one or more regulated output DC voltages required by the load, i.e., the microprocessor, the motor driver, and the like. For example, many logic devices on integrated circuits (ICs) work on 1.2, 3.6, and 5 V supplies from a converter while the power source supplies 12 V or other supply voltage. The DC-to-DC converter may be provided as part of an integrated circuit (IC) such as on an IC with a microprocessor or on a separate IC or provided as part of a standard circuit in other applications.

There are a variety of DC-to-DC converters designs, such as pulse-width modulated (PWM) converters and pulse-frequency modulated (PFM) converters, but generally each of the DC-to-DC converters includes a converter circuit and a driver. The converter circuit converts the input or supply voltage into a desired output or load voltage. The driver functions to provide control signals to the converter circuit to regulate the output or load voltage produced by the converter circuit. There are presently numerous converter circuits utilized in DC-to-DC converters. Two common converter circuits are labeled flyback converters and buck-boost converters based on their functioning and the arrangement of their circuit components. Other converters circuits include boost converters and buck converters.

To drive these converters, a driver is designed that include a variety of circuitry and components. For example, a common implementation of a driver includes blocks or devices to generate a reference voltage for use in regulating the output of the converter circuit, a feedback to sample the converter circuit output, a circuit for generating an error signal based on the reference voltage and the feedback signal, a modulator for modulating the output based on the error signal (such as a pulse-width modulator in a PWM converter), additional control components (e.g., a component for limiting the maximum duty cycle of the modulator signal, a current limitation device for limiting the current of a transistor in the converter circuit, and a voltage lock out circuit for switching on and off circuits in the driver based on the level of the input power), and a logic circuit for combining the signals of the other components and providing a drive signal to the converter circuit to regulate the converter circuits output.

To design or create a DC-to-DC converter, a driver is paired with one of the converter circuit types. In some cases, the driver is manufactured separately from the converter circuit, e.g., in two separate ICs. However, a driver is typically configured to drive a single type of converter circuit and cannot be used in multiple converter applications. For example, a driver may be designed and manufactured for use or pairing with a buck-boost converter circuit that includes a P-channel switching transistor. In other words, the driver is configured to provide a drive or output signal to drive this particular type of transistor. Without modification, this specially configured driver cannot be used with a flyback converter circuit, which includes an N-channel switching transistor. Presently, this problem is addressed by designing and manufacturing a unique driver for each of the converter circuits and by combining these differing drivers with the differing converter circuits to manufacture DC-to-DC converters. Redesigning the drivers for different types of converter circuits results in undesirable and often, unacceptable increased engineering and manufacturing costs associated with the produced DC-to-DC converters.

Hence, there remains a need for a driver for DC-to-DC converters that is compatible with more than one converter circuit type and is thus interchangeable. Preferably, such a driver would be able to interface with different converter circuits with minimal or no modification, would be relatively easy to produce with low associated costs with known existing manufacturing capabilities, and would be readily accepted by the electronics industry as providing effective control and/or regulation of the output of the converter circuit.

SUMMARY OF THE INVENTION

The present invention addresses the above problems by providing a driver for driving a converter circuit for a DC-to-DC converter. The driver design is unique in part because the convert circuit may be one of a number of converter types such as a flyback converter and a buck-boost converter and the driver is able to produce a driver signal to drive the converter without modification to the driver. In this regard, the driver includes a driver circuit having a number of components that act in combination to generate a regulated voltage from an input voltage from a power source, such as a battery or other DC source. For example, the driver circuit may be a PWM driver with blocks or elements such as a logic circuit for generating the driver signal provided to the converter circuit based on operation and input from a pulse width modulator, a current limitation element, a maximum DT limitation element, a $V_{REF}$ element, a feedback block linked to the converter circuit, and an under voltage lock out circuit. The operation of one or more of these blocks is controlled by an interface circuit which operates to sense the voltage input from the supply and to provide a drive selector signal to one or more of the blocks of the driver circuit to cause the blocks to operate properly for the detected type of converter. In one embodiment, the driver selector signal is provided to the logic circuit, the current limitation block, and the maximum DT limitation element but in other embodiments more or less blocks are controlled by the interface circuit. In this manner, the driver circuit is able to automatically adapt its operation to the type of converter circuit without requiring modification or manufacturing of multiple drivers for differing converter circuit types or modes.

More particularly, the interface circuit includes a voltage sensor that functions to sample the input voltage and in response, to a sensor signal. The interface circuit also includes a driver selector for comparing the sensor signal with a preselected voltage level or comparison voltage and based on the comparing generating the drive selector signal that is provided to the driver. In some embodiments, a comparator is provided in the selector to perform the comparing function. The voltage sensor generally includes a sense resistor for using in sensing the input voltage and more typically, includes a current-sense amplifier for generating the sensor signal. In one embodiment, the current-sense amplifier is adapted to be a high/low current-sense amplifier that can be connected to either the high or low side of the DC power source and still provide a substantially equivalent output voltage or sensor signal. Briefly, this is achieved with a switching device that operates based on the comparison of a sensed voltage to a preset reference voltage to select the use of a first circuit when connected to the high side or a second circuit when connected to the low side. The first and second circuits include matched input resistor devices with substantially equivalent resistance and additionally the first or high-side circuit (at least in one embodiment) includes an operational amplifier and a pair of current mirrors connected in cascade and the second or low-side circuit includes an operational amplifier and a current mirror (each of the current mirrors typically having a different configuration).

DETAILED DESCRIPTION OF THE PREFERRED EMBODIMENTS

The present invention is directed to providing a design solution that enables a single driver design or configuration to be utilized with two or more converter circuits in a DC-to-DC converter. In DC-to-DC converters configured according to the invention, a compatible interface, i.e., a driver interface control circuit, is provided for and linked to a driver to detect or sense the type of converter circuit employed in the DC-to-DC converter and to control operation of the driver based on the detected or sensed type of converter circuit. In this manner, the driver and interface circuit combination of the invention can be used widely to enhance system design and manufacturing efficiency. The sensing of the converter circuit is an important feature of the invention, and one aspect of the invention is directed to providing a voltage sensor that includes a current sense amplifier circuit that can be used on either the high side or low side of a power supply, which significantly increases the current sensor's flexibility especially in integrated circuit (IC) applications. Briefly and as will become clear from the following description with reference to FIGS. 7-10, the new current sense amplifier circuit uses an automatic controller switch to achieve a good power supply rejection ratio, to provide accurate current gain control, to use a low $V_{CC}$, and to be useful with a wide range of voltages.

Figure 1:
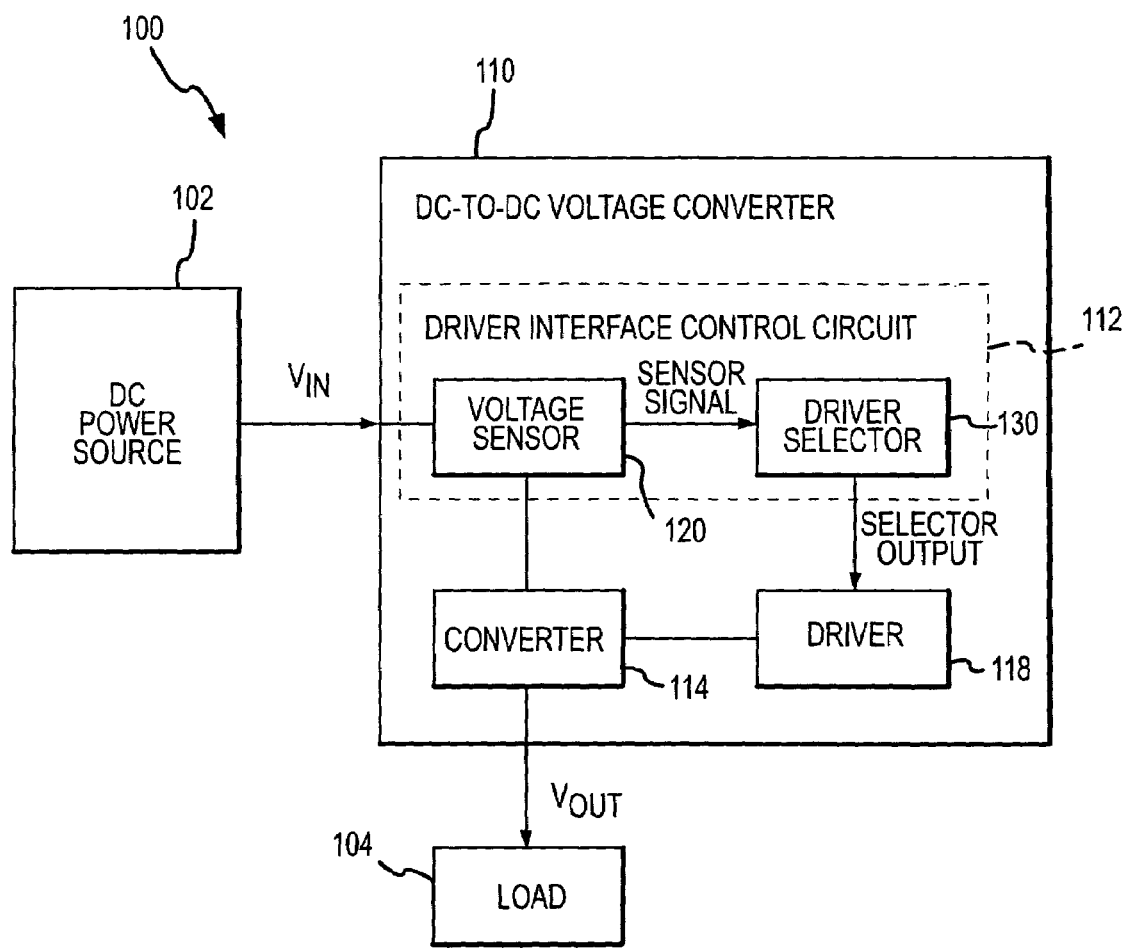
FIG. 1 is a simplified block diagram of system in which a DC-to-DC converter according to the present invention is used to convert voltage from a power source to a voltage output to a load.

FIG. 1 illustrates a system 100 that incorporates the driver interface concepts of the present invention. System 100 may be implemented in part or in its entirety on one or more ICs, e.g., the DC-to-DC converter 110 may be an IC, the driver interface control circuit and driver 112 may be an IC, the load 104 may be a logic device on the same or different IC as the DC-to-DC converter 110 or as one or more of the components of the converter 110. As shown, the system 100 is a typical system in which a DC voltage is converted by a converter to another DC voltage used by a load to operate. The system 100 includes a DC power source 102, such as a battery and the like, that provides DC power at one or more voltages, such as 1-36 VDC. A DC-to-DC converter voltage converter 110 is linked to the DC power supply 102 to receive the supply or input voltage, $V_{IN}$, and to convert the voltage to a load or output DC voltage, $V_{OUT}$, that is passed to a load 104 (e.g., another circuit or system or a device such as a logic device, microprocessor, motor controller, and the like).

The DC-to-DC converter 110 is configured according to the present invention with an adaptable driver such that a variety of converter types may be utilized within the DC-to-DC converter 110. As shown, a converter 114 is provided for converting the voltage in, $V_{IN}$, to another voltage, $V_{OUT}$, and in this regard, may be any of a number of converter types, such as but not limited to a buck converter, a boost converter, a buck-boost converter, or a flyback converter. The converter 114 is driven or regulated by a driver 118, which in turn is controlled by a driver interface control circuit 112. The driver 118 may take a number of configurations that are known in the electronic arts (such as the PWM driver 218 shown in FIG. 2) and the particular configuration of the driver is not limiting to the invention as different driver configurations may be used within the DC-to-DC converter 110.

The driver interface control circuit 112 is shown to be positioned in the DC-to-DC converter 110 between the DC power source 102 and the driver 118 and converter 114 to sample or sense the input voltage, $V_{IN}$, and in response, to transmit a control signal or a selector output signal to the driver 118, thereby controlling operation of the driver 118 based on a determined type of converter 114. In other words, the selector output from the control circuit 112 will vary with both the sensed voltage input, $V_{IN}$, and on the type of converter 114 detected or sensed. To provide these functions, the driver interface control circuit 112 includes a voltage sensor 120 that acts to sense the voltage, $V_{IN}$, at a sample point and to transmit a sensor signal, e.g., the sensed voltage, to a driver selector 130. In one embodiment, the driver selector 130 functions to compare the sensor signal to a predetermined voltage level, e.g., a comparison voltage, $V_{COMP}$, and in response to such comparison, to transmit a selector output signal that is used to control operation of the driver 118, i.e., by effecting operation of one or more of the components within the driver 118.

Figure 2:
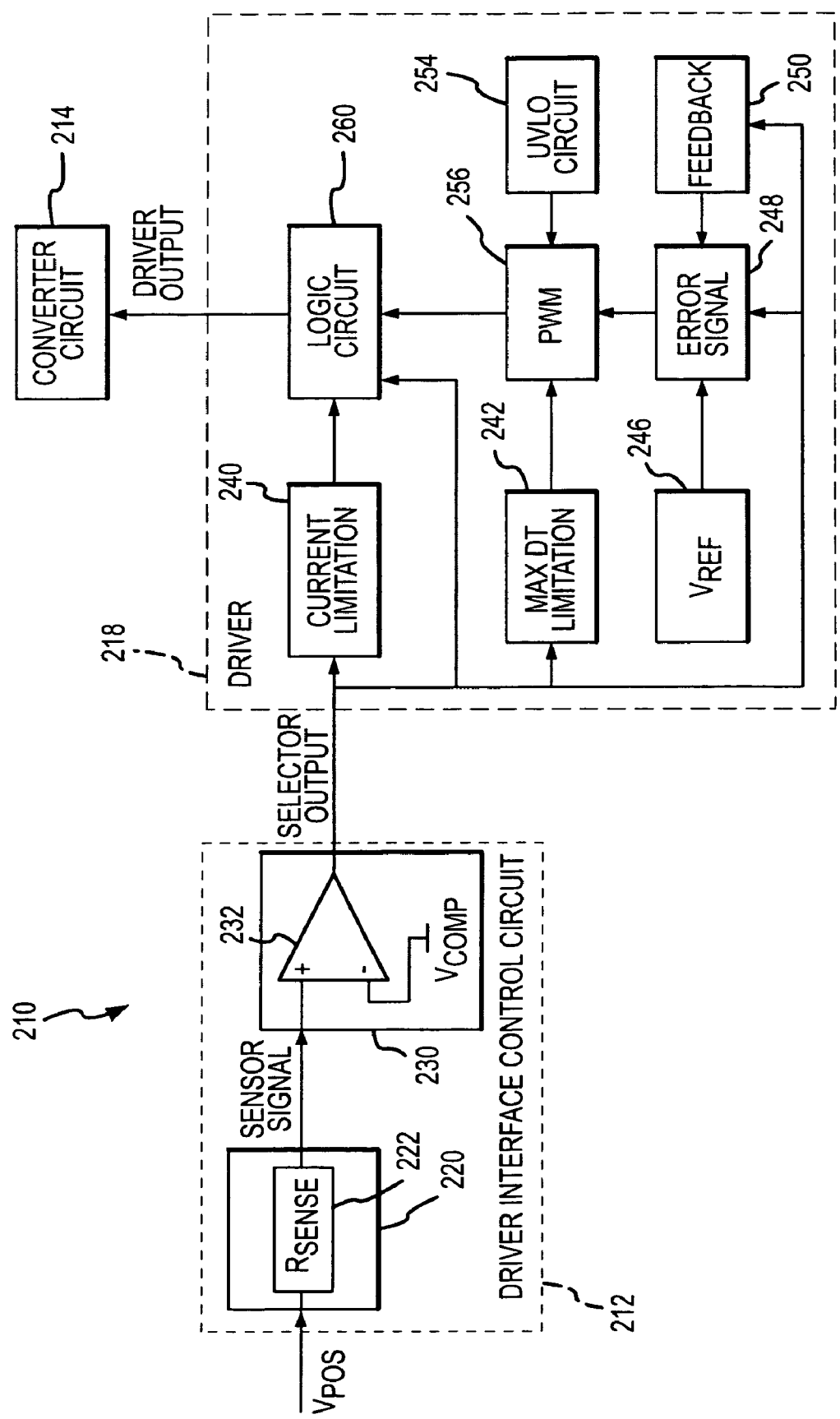
FIG. 2 is a block circuit diagram of DC-to-DC converter, such as the converter shown in FIG. 1, configured according to the invention with a driver interface control circuit operating a driver for use with a converter circuit which may have differing configurations.
Figure 3:
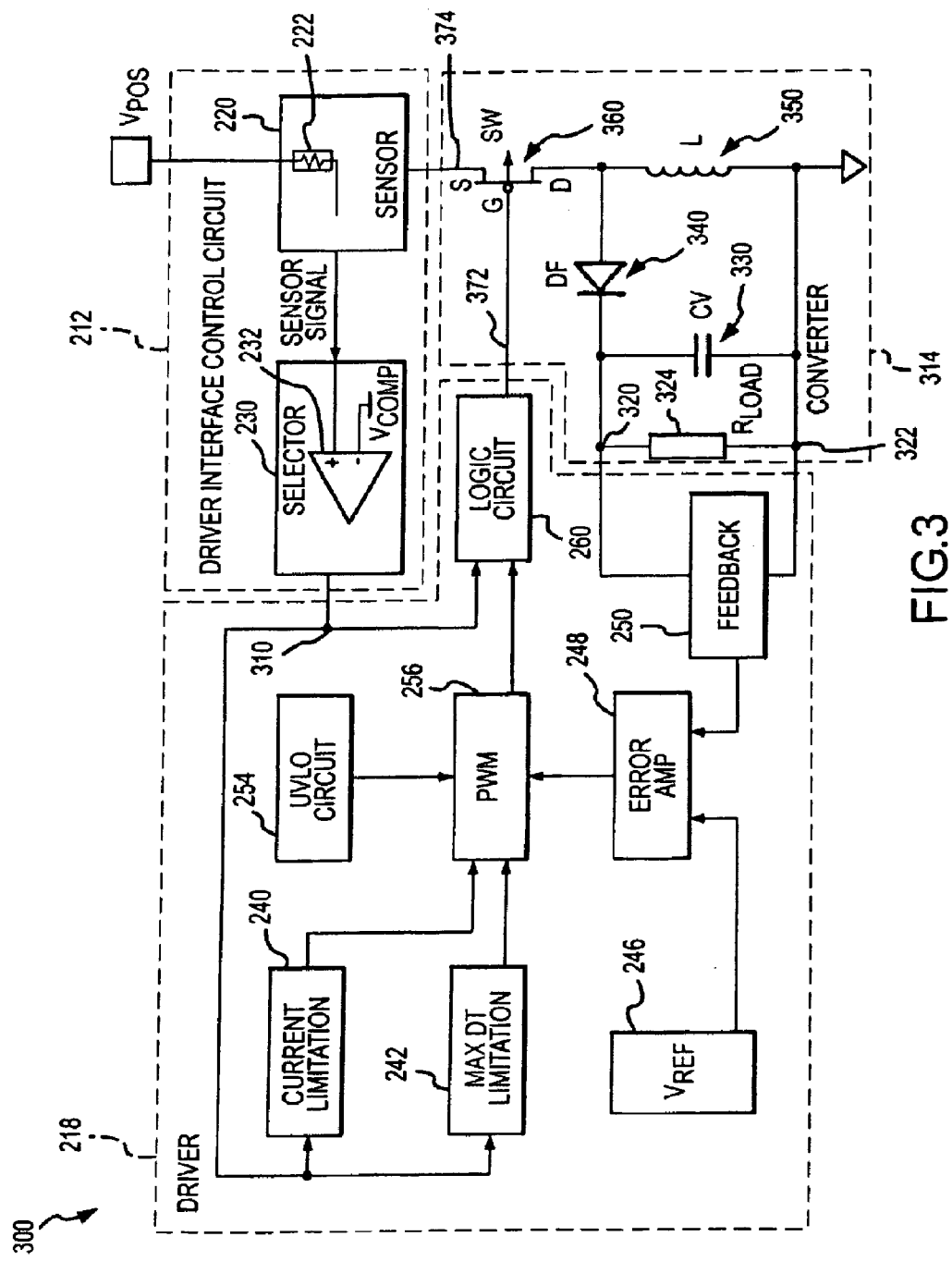
FIG. 3 is a block circuit diagram of a DC-to-DC converter according to the invention in which the drive interface control circuit and driver of FIG. 2 are used, without modification, with a buck-boost converter circuit.
Figure 4:
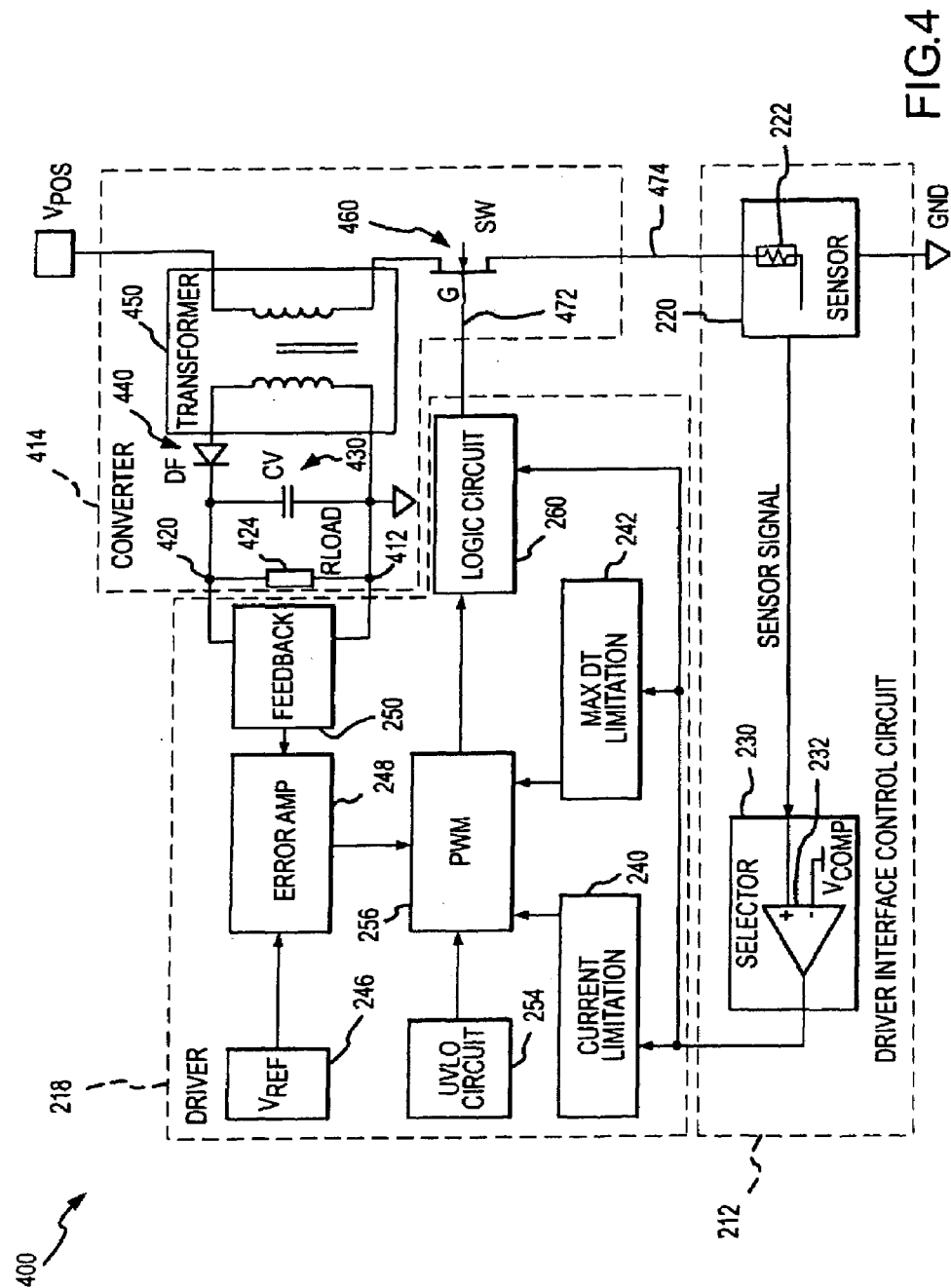
FIG. 4 is a block circuit diagram of a DC-to-DC converter similar to FIG. 3 in which the drive interface control circuit and driver of FIG. 2 are used, without modification, with a flyback converter circuit.

While the invention may be used with a variety of driver configurations, it may be useful to illustrate the interface concepts implemented with a relatively standard driver implementation, i.e., a pulse-width modulator (PWM) driver. Referring to FIG. 2, a DC-to-DC converter 210 is shown that is configured according to the invention with a converter circuit 214 for converting an input DC voltage, $V_{POS}$, to another voltage useful by a load (not shown). In between the converter circuit 214 and the voltage source, a driver 218 is provided for driving the converter circuit 214 with a driver output signal. The driver output signal is regulated or selected in part based on a converter selector output signal from a driver interface control circuit 212 linked to the input voltage line and to the driver 218 (and, typically, to the converter circuit 214 as shown in FIGS. 3 and 4).

The driver 218 includes a number of components that work in combination to produce the driver output signal and one or more of these components are controlled by a selector signal from the driver interface control circuit 212. The exemplary driver 218 is illustrated to have a relatively standard set of components and arrangement of these components, but other embodiments of the invention may include additional components, include fewer components, and/or include a different circuit or arrangement of such components. As shown, the driver 218 includes a current limitation element or block 240 that is used to limit the maximum current of a switching transistor (see, for example, the converter circuits shown in FIGS. 3 and 4) by providing a signal to a logic circuit 260. The logic circuit 260 generates the driver output signal and, briefly, functions to combine the signals from the other components of the driver 218 and although not shown, is used to drive with the driver output signal the external switching transistor of the converter circuit 214. A maximum DT limitation block 242 is provided in the driver 218 for limiting the maximum duty cycle of the PWM signal from the pulse-width modulator 256. The $V_{REF}$ element 246 is provided for generating a reference voltage, and the regulated output voltage of the converter circuit 214 is proportional to this voltage.

The $V_{REF}$ element 246 provides a signal to the error signal block or element 248 which functions to generate an error signal or error amp to the PWM 256 by comparing the reference voltage with the feedback signal received from the feedback block 250. The feedback block 250 is used to sample the regulated output voltage of the converter circuit 214 and provide a feedback signal to the error signal block 248. The UVLO (under voltage lock out) circuit 254 is included to switch on and off corresponding circuits or elements of the driver 218 according to a level of the power supply or input voltage, $V_{POS}$. The PWM 256 provides a signal to the logic circuit 260 and the pulse-width modulation is the width of pulse signal generated by the error signal from the error amp or signal block 248.

To enable the driver 218 to interface with the converter circuit 214 without modification to suit the configuration or type of the circuit 214, the driver interface control circuit 212 is provided to sample the input voltage, $V_{POS}$, and to determine the type or configuration of the converter circuit 214, and in response, to transmit a selector output or control signal to one or more of the driver 218 components to control their operations. To generate the selector output or driver control signal, the driver interface control circuit 212 includes a sensor 220 and a driver selector 230. The sensor 220 includes a sense resistor 222 and functions to sense the voltage, $V_{POS}$, at a sample point that may be before the converter circuit 214 as shown or after the converter circuit 214 (such as that shown in FIG. 4). The sensor 220 then sends a sensor signal to the driver selector 230 for "selecting" a converter type. This selecting is achieved in the illustrated embodiment by a comparator 232 that compares the sensor signal with the voltage, $V_{COMP}$. The comparator's output is the selector output that is used to control one or more elements or blocks of driver 218. For example, as shown, the selector output is passed to the current limitation 240, the maximum DT limitation 242, the error signal, feedback, and logic circuit 260 blocks or elements. In this fashion, the driver 218 is controlled by the driver interface control circuit 212 in order to properly interface with the converter circuit 214 without the need for modifying the driver 218 to suit the configuration of the converter circuit 214 (i.e., interface without regard to the type of converter used in the DC-to-DC converter 210).

With an understanding of the broader principles of the invention understood, a description of a couple of specific DC-to-DC implementations with drivers and driver interface control circuits of the invention are provided with reference to FIGS. 3 and 4. Specifically, the proposed driver with interface circuitry are shown in use (without modification) in both a buck-boost DC-to-DC converter and a flyback DC-to-DC converter. These are two of the main types or modes of converter circuits presently in use, and are, therefore, useful for illustrating how the driver/interface combination of the present invention will have wide spread and effective use in the electronics industry.

A DC-to-DC converter 300 is shown in FIG. 3 with a buck-boost converter 314. The DC-to-DC converter 300 includes the driver interface control circuit 212 as shown and explained with reference to FIG. 2 along with the driver 218 as also shown in FIG. 2. The driver interface control circuit 212 is connected so as to sample the input voltage, $V_{POS}$, from a voltage source (such as source 102 of FIG. 1). The sensor 220 is further linked to the converter 314 (and, specifically, to the source side of switch 360, e.g., a MOSFET and the like, via line 374) to pass through the supplied voltage, VPOS, to the converter 314 for conversion to an output voltage (e.g., across load resistor 324). The selector output is passed to the driver 218 from selector 230 via connection at node 310. Note, the selector 230 of control circuit 212 is shown in FIG. 2 to drive different components of the driver 218 that is shown in FIG. 2, and particularly is shown to control operation of the current limitation block 240, the maximum DT limitation block 242, and, at least in part, the logic circuit 260. The driver 218 is likewise linked to the converter 314 for providing a driver output or control signal to the converter (and, specifically, to the gate of the switch 360 via line 372).

The converter 314 is a buck-boost converter that includes a switch 360 (i.e., a P-channel switching transistor or the like) linked at the source connection via the source line 374 to the voltage sensor 220 of the driver interface control circuit 212 and to the logic circuit 260 of the driver 218 at the gate connection via line 372 to receive the driver output signal. The drain connection of the switch 360 is connected in series with a flywheel diode 340 and in parallel to the feedback block 250 of the driver 218, a filter capacitor 330, an energy-storage inductor 350, and a load as shown by load resistor 324.

FIG. 4 illustrates a flyback mode DC-to-DC converter 400 being driven by similarly configured driver 218 without modification due to the inclusion of the driver interface control circuit 212. As shown, the driver 218 is linked in parallel via the feedback block 250 to the converter circuit 414 and via line 472 that is connected to the gate of switch 460 and the logic circuit 260 of the driver 218. The driver interface control circuit 212 provides a control signal to the driver 218 (i.e., to the current limitation block 240, the maximum DT limitation block 242, and logic circuit 260) based on a voltage sampled on line 474 that is connected to the source connection of switch 460 and to the sense resistor 222 of the sensor 220. The sensor 220 provides a sensor signal to the selector 230 where it is compared by comparator 232 to a selected voltage, $V_{COMP}$, and the selector 230 provides a control or selector output signal to the driver components shown.

The converter circuit 414 is a flyback mode or type DC-to-DC converter and as such includes an energy-storage transformer 450 connected to the input voltage, $V_{POS}$, and to the drain of the switch 460, i.e., an N-channel MOSFET or switching transistor or the like. The converter circuit 414 further includes a flywheel diode 440 in series with the transformer 450 and a filter capacitor 430 in parallel with the transformer 450. The converter 414 is connected to a load represented by load resistor 424 to provide a regulated output (or converted) voltage based on the input voltage, $V_{POS}$, and driver signal on line 472 from the logic circuit 260 of the driver 218.

In the DC-to-DC converters 300 and 400, the sensor 220 senses the voltage of the P-channel switching transistor's source 374 or N-channel switching transistor's source 474. The output of the sensor 220 is fed to the selector 230 where a comparator 232 compares the sensor signal with the comparison voltage, $V_{COMP}$. If the sensor signal is higher than $V_{COMP}$, the converter 314 or 414 is determined by the driver interface control circuit 212 to be a buck-boost converter and if lower, than a flyback converter. The output of the control circuit 212 is then used to control the corresponding blocks or components (i.e., as shown, in FIGS. 3 and 4, the current limitation block, the maximum DT limitation block, and the logic circuit) of the driver 218 to allow the driver to interface and drive the different types of converter circuits 314, 414. The driver 218 is able to drive the differing converter circuits 314, 414 without modification and automatically.

Figure 5:
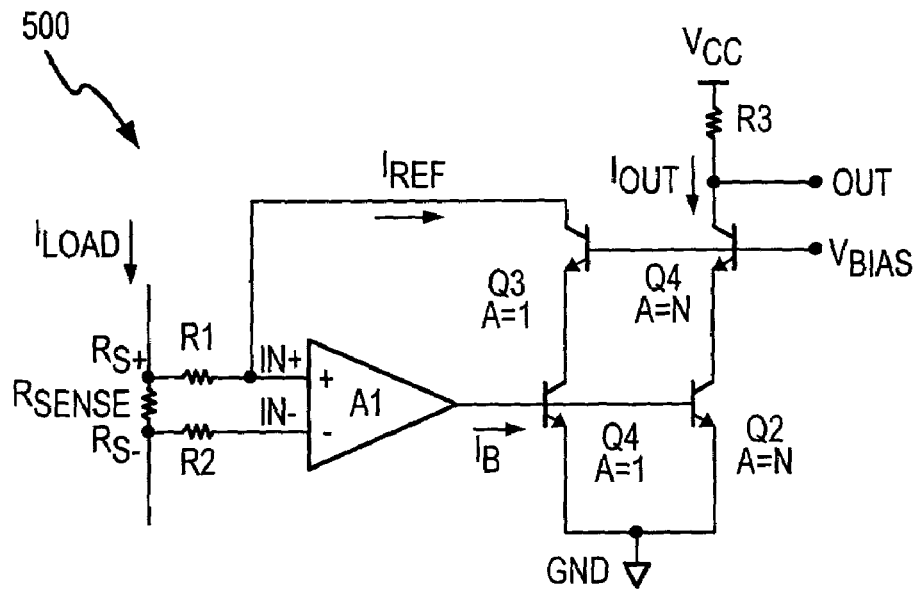
FIG. 5 is a circuit diagram of a known current sense amplifier that may be utilized as the voltage sensor of the driver interface control circuit of the invention, such as in the control circuit shown in FIGS. 1-4.
Figure 6:
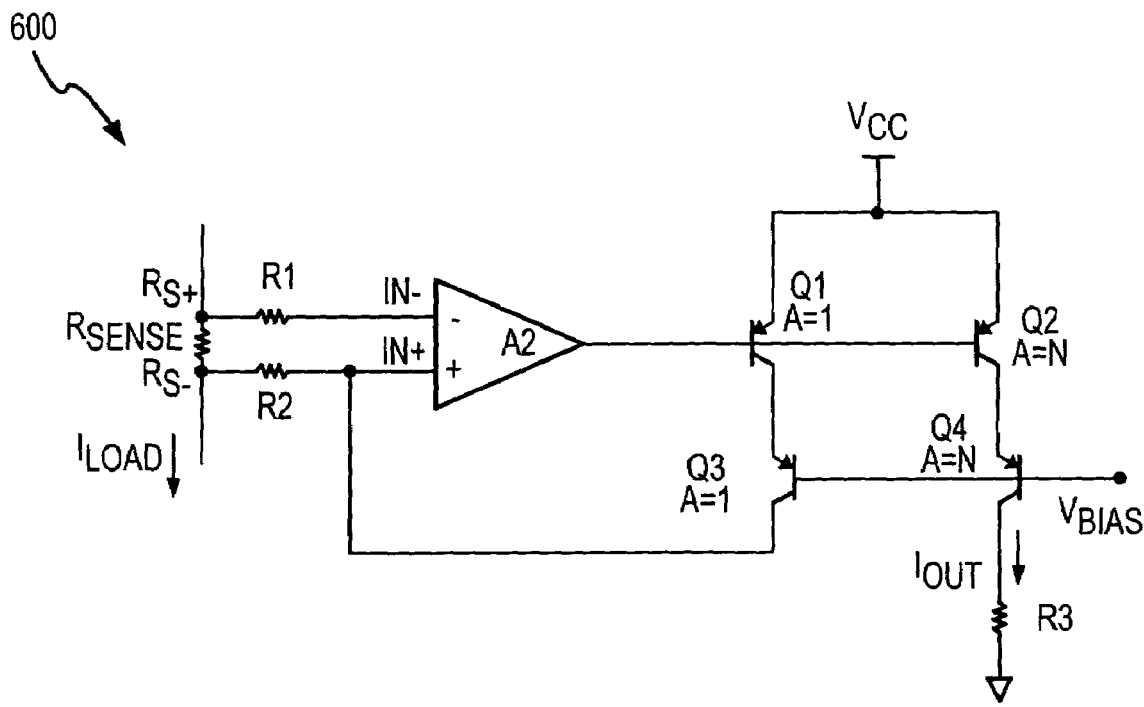
FIG. 6 is a circuit diagram similar to FIG. 6 of another known current sense amplifier that may be utilized as the voltage sensor of the driver interface control circuit of the present invention, such as in the control circuit of FIGS. 1-4.

The voltage sensor 120, 220 of the driver interface control circuits 112, 212 may take a number of forms to practice the invention. As shown in FIGS. 1-4, the sensor generally senses the sensor signal to the driver selector 130, 230 used for comparison with a voltage, $V_{COMP}$, that can be set for comparator 230. In some embodiments, the sensor 120, 220 includes a current-sense amplifier to facilitate generating the sensor signal. FIGS. 5 and 6 illustrate two classical current-sense amplifiers 500 and 600 that may be used as part of the voltage sensor 120, 220 to provide a sensor signal to the driver selector 130, 230. As these amplifiers 500, 600 are relatively standard devices, their components and operation is not explained in detail because it will be understood by those skilled in the art from the circuit drawings of FIGS. 5 and 6.

Briefly, though, the current-sense amplifier 500 of FIG. 5 is for use in high-side sensing on a positive supply (such as with source 102 of FIG. 1). The amplifier 500 is configured to use an NPN transistor in the comparator A1's input stage. In operation, the current-sense amplifier 500 is connected in DC-to-DC converters 100, 210, 300, 400 such that the large load current, $I_{LOAD}$, flows through the sense resistor, $R_{SENSE}$ (e.g., resistor 222 of FIGS. 2-4) from the $R_S+$ node to the connection with the converter 114, 214, 314, 414. Current also flows through R1, Q3, and Q1 and an output voltage signal (i.e., sensor signal) is generated by flow through output resistor, R3.

In contrast, the current sense amplifier 600 of FIG. 6 is for use in low-side sensing on a negative supply (such as with source 102 of FIG. 1). The amplifier 600 is configured to use the PNP transistor in A2's input stage. In operation, the current-sense amplifier 600 is connected in DC-to-DC converters 100, 210, 300, 400 such that the current, $I_{LOAD}$, flows through the sense resistor, $R_{SENSE}$ (e.g., resistor 222 of FIGS. 2-4) to the connection with the converter 114, 214, 314, 414. A voltage signal or sensor signal is generated by current flow directed through the output resistor, R3. As noted, the amplifiers 500, 600 are only useful, respectively, for use on the high side or low side of the power supply. The amplifiers 500, 600 (and amplifier 700 of FIG. 7) are often incorporated in an IC, and it is desirable to provide a current-sense amplifier that is more flexible in its use and applications.

Figure 7:
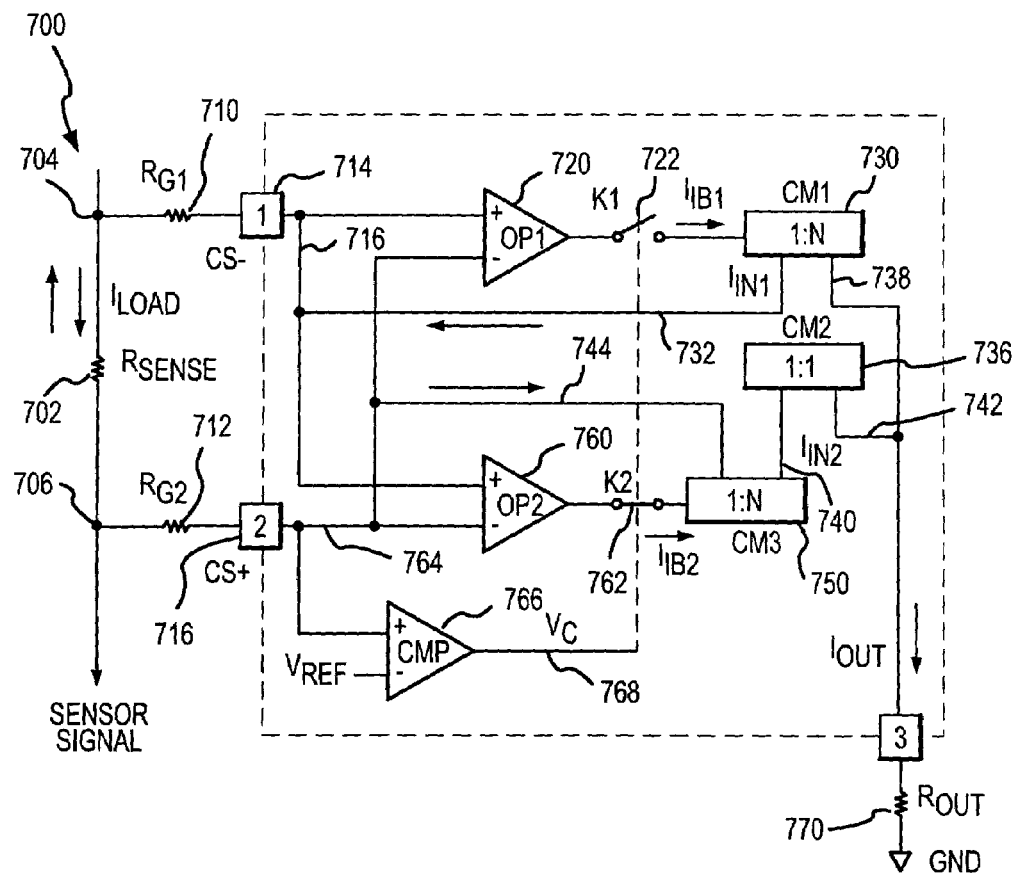
FIG. 7 is a high/low side current sense amplify circuit that may be used for the voltage sensor of the driver interface control circuit (or in other applications) of the present invention in place of the amplifiers shown in FIGS. 5 and 6.

In this regard, the invention includes the current-sense amplifier 700 of FIG. 7 that is able to sense a large current that can be either on the high side or low side of the power supply. The current-sense amplifier 700 is further configured with an automatic controller switch to provide good PSSR, accurate gain control, and low $V_{CC}$. The current sense amplifier 700 is connected between the power supply (such as source 102) and converter circuits 114, 214, 314, 414 such that load current, $I_{LOAD}$, flows in either direction through sense resistor 702 (e.g., resistor 222 of FIGS. 2-4). The current-sense amplifier circuitry is connected on both sides of the sense resistor 702 at nodes 704 and 706 and current flows through resistors $R_{G1}$ and $R_{G2}$ to provide sensed current, CS− and CS+ to the other components of the amplifier 700 at points 714, 716.

The high/low sense amplifier 700 can be thought of as constructed mainly of operational amplifiers 720 and 760 (labeled OP1 and OP2) and current mirrors 730, 736, and 750 (labeled CM1, CM2, and CM3) with connecting lines 716, 732, 738, 742, 744, 764, and 768. In a one embodiment, OP1 720 has an input stage that uses a PNP transistor while OP2 760 has an input stage that uses an NPN transistor (although other OP amps may be utilized to practice the invention). The amplifier 700 further includes a comparator 766 (labeled CMP) that is connected to line 764 and is included to provide a control signal, $V_C$, to controlled switches 722, 726 (labeled K1 and K2) to control the switches 722, 726 on or off by comparing $V_{CS+}$ and $V_{REF}$ (e.g., 1.6 V and the like depending on the power supply).

Figure 10:
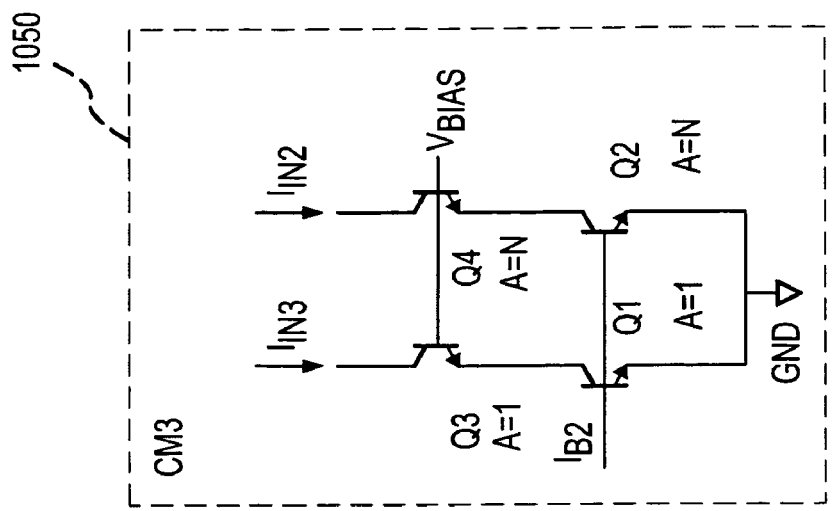
FIGS. 8-10 illustrate useful embodiments of the current mirrors of the current sense amplify circuit shown in FIG. 7.
Figure 9:
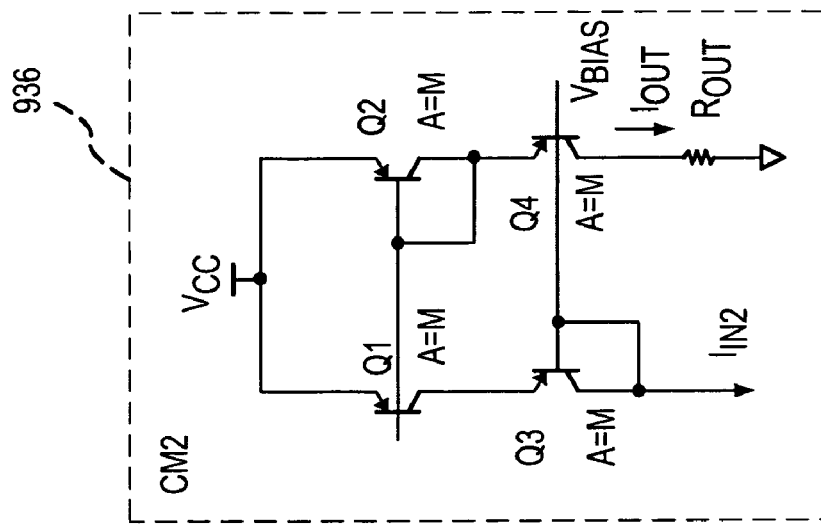
Figure 8:
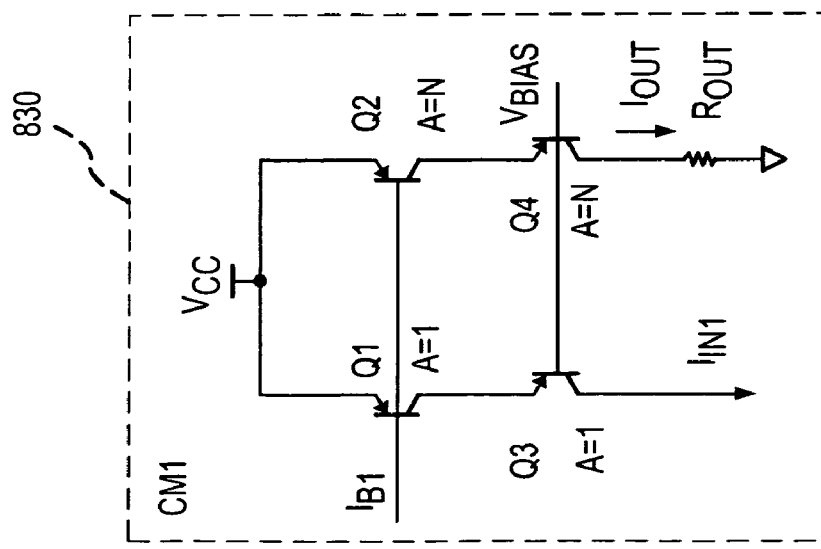

The current mirrors CM1, CM2 and CM3 730, 736, and 750 are precision current mirrors. While other configurations can be employed in the amplifier 700, FIGS. 8-10 illustrate exemplary circuits that can be used for the mirrors with the particular embodiments labeled CM1 830, CM2 936, and CM3 1050. As shown, for CM1 830 and CM3 1050, transistors Q1 and Q2 provide an accurate current mirror. Q3 and Q4 are matched transistors connected in cascade with transistors Q1 and Q2 for boosting the output impedance. For CM2 936, transistors Q1, Q2, Q3, and Q4 construct a Wilson current mirror.

Referring again to FIG. 7 with further reference to FIGS. 8-10, when $R_{SENSE}$ 702 is put on the high side of the power supply (e.g., $V_{CS+}$ is higher than $V_{REF}$), $V_C$ will be high thus making gate K1 722 switch off and gate K2 762 switch on (as shown in FIG. 7). In this case, OP amp O1 720 and current mirror CM1 730 do not operate but OP amp O2 760 and current mirrors CM2 and CM3 736, 750 do work or operate. Neglecting the input bias current of OP amp O2 760, $$I_{OUT}=(N)(I_{LOAD})(R_{SENSE}/R_{G2})$$

The output voltage of the current-sense amplifier 700 (or the sensor signal) is provided by the current out, $I_{OUT}$, flowing through the output resistor, $R_{OUT}$ 770.

When $R_{SENSE}$ 702 is put on the low side of the power supply (e.g., $V_{CS+}$ is lower than $V_{REF}$), $V_C$ will be low which makes gate K1 722 switch on and gate K2 762 switch off. In this state of the amplifier 700, OP amp OP1 720 and current mirror CM1 730 are operational while OP amp OP2 760 and current mirrors CM2 and CM3 736 and 750 are not operational or working. Neglecting the input bias current of OP amp OP1 720, $$I_{OUT}=(N)(I_{LOAD})(R_{SENSE}/R_{G1})$$

Again, the output voltage of the current-sense amplifier 700 (or the sensor signal) is provided by the current out, $I_{OUT}$, flowing through the output resistor, $R_{OUT}$, 770. If $R_{G1}$ 710 and $R_{G2}$ 712 are matched resistors whose resistance values are substantially equal, whenever $R_{SENSE}$ 702 is placed on the high or low side of a power supply, the following equation is achieved (e.g., $R_G=R_{G1}=R_{G2}$):

$$I_{OUT}=(N)(I_{LOAD})(R_{SENSE}/R_G)$$

In this manner, the output voltage or sensor signal is substantially the same whether the current-sense amplifier 700 of voltage sensor 120, 220 is connected on the high or low side of the power source (such as source 102 of FIG. 1).

The transistors of the current mirrors 730, 736, 750 (as shown in examples of mirrors 830, 936, and 1050 of FIGS. 8-10) can provide a wide output voltage or sensor signal range. Gain can be calculated with the following formula:

$$V_{OUT}/V_{RSENSE}=(N)(R_{OUT}/R_G)$$

From the equation, the gain can be set by adjusting the ratio of the resistor $R_{OUT}$ 770 and $R_G$ (i.e., $R_{G1}$ 710 and $R_{G2}$ 712).

The above disclosure sets forth a number of embodiments of the present invention. Other arrangements or embodiments, not precisely set forth, could be practiced under the teachings of the present invention and as set forth in the following claims.

We claim:

1. A driver for driving a DC-to-DC converter circuit that may have at least two configurations for converting an input voltage from a power source to a regulated voltage, comprising:
a driver circuit having a number of components acting to generate a driver output signal for driving the DC-to-DC converter circuit to generate the regulated voltage; and
a driver interface control circuit electrically connected to the driver circuit transmitting a selector output signal to one or more of the components of the driver circuit, the driver interface control circuit including an automatic bi-mode voltage sensor sensing the input voltage and generating a sensor signal corresponding to the sensed input voltage and including a driver selector receiving the sensor signal and generating the selector output signal to control operation of the driver circuit,
wherein the voltage sensor comprises a current-sense amplifier generating the sensor signal operable in a first state and a second state corresponding to connection of the current-sense amplifier to a high side and a low side, respectively, of the power source and wherein the sensor signal is substantially equivalent in the first and second states and includes means for selecting a first circuit or a second circuit for generating an output current that generates the sensor signal, the selecting comprising comparing a voltage input to the current-sense amplifier to a reference voltage.

2. The driver of claim 1, wherein the two configurations include a buck-boost converter and a flyback converter and wherein the selector output signal is generated by the driver selector to indicate whether the DC-to-DC converter circuit comprises a buck-boost converter or a flyback converter.

3. The driver of claim 2, wherein the voltage sensor includes a sense resistor, the sense resistor electrically connected to a source of a transistor in the DC-to-DC converter circuit.

4. The driver of claim 1, wherein the driver selector comprises a comparator generating the selector output signal by comparing the sensor signal to a comparison voltage.

5. The driver of claim 1, wherein the driver components include a logic circuit for generating the driver output signal based on input from other ones of the driver components, the logic circuit being connected to the driver selector and receiving the selector output signal.

6. The driver of claim 5, wherein the other components include a current limitation device and a maximum duty cycle limitation device both linked to the driver interface control circuit and receiving the selector output signal, the operation of the devices being based on the selector output signal.

7. The driver of claim 1, wherein the first circuit includes a first operational amplifier and a first and a second current mirror connected in series and wherein the second circuit includes a second operational amplifier and a third current mirror.

8. The driver of claim 7, wherein the current-sense amplifier includes a first and second resistor device for connecting to the high and the low sides of the power source and to the first and second circuits, respectfully and wherein the first and second resistor devices have substantially equal resistance values.

9. A DC-to-DC converter, comprising:
a converter circuit for converting an input DC voltage to an output DC voltage, the converter circuit being configured as a buck-boost converter or flyback converter;
a driver electrically connected to the converter circuit for providing a driver signal to the converter circuit for driving the converter circuit; and
an automatic bi-mode interface circuit electrically connected to the converter circuit and the driver so as to sample the input DC voltage and to provide a selector signal based on the sampled input DC voltage to the driver to control operation of the driver,
wherein the interface circuit comprises a current-sense amplifier for sensing the input DC voltage and in response, generating a sensor signal and further comprises a driver selector receiving the sensor signal, comparing the sensor signal to a comparison voltage, and based on the comparing, generating the selector signal operable in a first state and a second state corresponding to connection of the current-sense amplifier to a high side and a low side, respectively, of a power source supplying the input DC voltage and wherein the sensor signal is substantially equivalent in the first and second states and includes means for selecting a first circuit or a second circuit for generating an output current that generates the sensor signal.

10. The converter of claim 9, wherein the selector signal indicates to the driver whether the converter circuit is configured as a buck-boost converter or as a flyback converter.

11. The converter of claim 9, wherein the driver includes a logic circuit for generating the driver signal based the selector signal.

12. A driver for use with multiple DC-to-DC converter types, comprising:
    means for automatically sensing an input voltage from a power supply and generating a sensor signal based on the sensing in one of two operational modes;
    means for comparing the sensor signal to a comparison voltage and generating a selector signal based on the comparing, the selector signal indicating one of the DC-to-DC converter types; and
    means for driving a DC-to-DC converter circuit linked to the comparing and generating means as the one DC-to-DC converter type with a driver signal based on the selector signal,
    wherein the sensing and generating means comprises a voltage sensor sensing the input voltage and generating the sensor signal corresponding to the sensed input voltage, the voltage sensor comprising a current-sense amplifier operable in a first state and a second state corresponding to connection of the current-sense amplifier to a high side and a low side, respectively, of a power source supplying the input voltage and wherein the sensor signal is substantially equivalent in the first and second states and includes means for selecting a first circuit or a second circuit for generating an output current that generates the sensor signal.

13. The driver of claim 12, wherein the converter types include flyback and buck-boost and wherein the comparing and generating means comprises a comparator generating the selector signal by comparing the sensor signal to a comparison voltage, the selector signal indicating the converter type being flyback or buck-boost.

* * * * *

UNITED STATES PATENT AND TRADEMARK OFFICE
CERTIFICATE OF CORRECTION

| | |
|---|---|
| PATENT NO. | : 7,459,894 B2 |
| APPLICATION NO. | : 11/104909 |
| DATED | : December 2, 2008 |
| INVENTOR(S) | : Guojun Li et al. |

It is certified that error appears in the above-identified patent and that said Letters Patent is hereby corrected as shown below:

Fig. 7 "762" should be --726--

Column 1, line 57, "include" should be --includes--

Column 8, line 64, "762" should be --726--

Column 8, line 65, "O1" should be --OP1--

Column 8, line 66, "O2" should be --OP2--

Column 9, line 2, "O2" should be --OP2--

Column 9, line 9, "762" should be --726--

Column 11, line 2, after "based" insert --on--

Signed and Sealed this

Twenty-fifth Day of May, 2010

David J. Kappos
*Director of the United States Patent and Trademark Office*